United States Patent
Cheikh

(10) Patent No.: US 10,144,392 B1
(45) Date of Patent: Dec. 4, 2018

(54) DEVICE FOR A TWO-WAY DETECTION OF THE APPROACH OF A PORTABLE APPARATUS FOR HANDS-FREE ACCESS TO A VEHICLE AND ASSOCIATED DETECTION METHOD

(71) Applicants: Continental Automotive France, Toulouse (FR); Continental Automotive GmbH, Hannover (DE)

(72) Inventor: Mohamed Cheikh, Toulouse (FR)

(73) Assignees: Continental Automotive France, Toulouse (FR); Continental Automotive GmbH, Hannover (DE)

(*) Notice: Subject to any disclaimer, the term of this patent is extended or adjusted under 35 U.S.C. 154(b) by 0 days.

(21) Appl. No.: 15/772,561

(22) PCT Filed: Nov. 3, 2016

(86) PCT No.: PCT/EP2016/001824
§ 371 (c)(1),
(2) Date: May 1, 2018

(87) PCT Pub. No.: WO2017/076500
PCT Pub. Date: May 11, 2017

(30) Foreign Application Priority Data

Nov. 5, 2015 (FR) .................................... 15 60602

(51) Int. Cl.
*B60R 25/24* (2013.01)
*G07C 9/00* (2006.01)

(52) U.S. Cl.
CPC ........ *B60R 25/245* (2013.01); *G07C 9/00309* (2013.01); *G07C 2009/00317* (2013.01);
(Continued)

(58) Field of Classification Search
CPC .......................... B60R 25/245; G07C 9/00309
(Continued)

(56) References Cited

U.S. PATENT DOCUMENTS

| | | | |
|---|---|---|---|
| 9,030,144 B2* | 5/2015 | Boisvert | B60J 7/0573 318/266 |
| 2013/0244577 A1 | 9/2013 | Cheikh | |
| 2015/0005982 A1* | 1/2015 | Muthukumar | B60T 1/10 701/1 |

FOREIGN PATENT DOCUMENTS

| WO | 2004104943 A1 | 12/2004 |
|---|---|---|
| WO | 2009143415 A1 | 11/2009 |

OTHER PUBLICATIONS

English Translation of the Written Opinion for International Application No. PCT/EP2016/001824, dated Feb. 3, 2017, 7 pages.
(Continued)

*Primary Examiner* — Allen T Cao
(74) *Attorney, Agent, or Firm* — RatnerPrestia

(57) ABSTRACT

A device for two-way detection of the approach of a portable apparatus for near-field hands-free access to a vehicle, said device including a communication antenna having a near-field communication frequency, the device including: a first passive inductive sensor oriented towards the outside of the vehicle, a second passive inductive sensor oriented towards the inside of the vehicle, the two sensors being arranged so as to face one another, separated by a ferrite, and receiving the electromagnetic field emitted by the communication antenna, and being capable of detecting the approach of the portable apparatus; a device for measuring a first voltage across the terminals of the first sensor and a device for measuring a second voltage across the terminals of the second sensor; a device for comparing the first voltage and the second voltage in order to detect the approach of the portable apparatus coming from outside or coming from inside the vehicle.

12 Claims, 3 Drawing Sheets

(52) U.S. Cl.
CPC .............. *G07C 2009/00777* (2013.01); *G07C 2209/63* (2013.01)

(58) Field of Classification Search
USPC ................................................ 340/5.7–5.74
See application file for complete search history.

(56) References Cited

OTHER PUBLICATIONS

International Search Report and Written Opinion for International Application No. PCT/EP2016/001824, dated Feb. 3, 2017, 8 pages.

\* cited by examiner

DEVICE FOR A TWO-WAY DETECTION OF THE APPROACH OF A PORTABLE APPARATUS FOR HANDS-FREE ACCESS TO A VEHICLE AND ASSOCIATED DETECTION METHOD

CROSS REFERENCE TO RELATED APPLICATIONS

This application is the U.S. National Phase Application No. PCT/EP2016/001824, filed Nov. 3, 2016, which claims priority to French Application No. 1560602, filed Nov. 5, 2016, the contents of such applications being incorporated by reference herein.

FIELD OF THE INVENTION

The invention relates to a device for the bidirectional detection of the approach of a portable apparatus for hands-free access to a vehicle and to an associated detection method.

The invention applies more particularly to the detection of the approach of a portable apparatus for hands-free access via NFC (acronym for 'near-field communication') communication, that is to say a radiofrequency communication at 13.56 MHz with a low range, of the order of around ten centimeters at most.

BACKGROUND OF THE INVENTION

It is nowadays common to use a near-field magnetic coupling communication technology, such as NFC technology. This communication technology is able to be used for many applications, such as for example to pay contactlessly using for example a bank card or a mobile appliance such as a mobile telephone or a digital tablet. This technology may also be implemented in order to enable a user to access a vehicle and to start it using a mobile telephone, for example.

This technology has the advantage of enabling an identifier to be exchanged between for example a mobile telephone and a vehicle, at a secure distance, of the order of around ten centimeters, and therefore of enabling a vehicle to be either unlocked or started in complete security.

It is therefore known to equip a vehicle with NFC hands-free access means, either for unlocking or for starting said vehicle.

To this end, the vehicle generally comprises, for unlocking those components of the vehicle that open, a first NFC antenna, directed toward the outside of the vehicle, for example situated in a door handle, and a first NFC reader, linked to a microcontroller and for starting the engine of the vehicle, a second NFC antenna, situated inside the vehicle, for example, in the dashboard, and a second NFC reader, linked to a second microcontroller or to the same microcontroller.

In other words, the vehicle comprises two identical NFC detection systems (NFC antenna, NFC reader and microcontroller) at two separate locations on the vehicle, each dedicated to one action: unlocking or starting the vehicle.

It will be understood, for reasons of cost and of ergonomics, that it would be desirable to group together these two NFC detection systems into a single one, situated in a single position on the vehicle, able to be accessed from the outside and from the inside, for example either in the driver's door of the vehicle, or in a window pane of said door, so as to detect the approach of the user's apparatus, whether it be situated outside or inside the vehicle, so as to trigger the corresponding action, i.e. unlocking or starting.

The NFC bidirectional detection device D from the prior art is illustrated in FIG. 1.

A first NFC antenna A1 is directed toward the outside EXT of the vehicle and a second NFC antenna A2 is directed toward the inside INT of the vehicle, said two antennae A1, A2 are situated opposite one another, separated by two layers of ferrites F1, F2, which layers are themselves spaced apart by a copper layer C situated on a printed circuit board 10.

NFC antenna is understood here to mean an RFID (acronym for 'radiofrequency identification') tag.

The proximity of the two NFC antennae creates interference and requires the presence of two additional ferrites F1, F2 (as illustrated in FIG. 1) that are separated by a conductive copper layer C.

The copper layer C makes it possible to dissipate the few electromagnetic currents that manage to pass through the ferrites F1, F2; specifically, said ferrites do not provide perfect shielding of the electromagnetic waves received by the NFC antennae A1 and A2. A small number of the electromagnetic waves received by the first or by the second NFC antenna A1, A2 pass through the first ferrite F1 or the second ferrite F2 and then disturb the other of said two NFC antennae A1, A2. The copper layer C has the advantage of dissipating these electromagnetic waves, thus preventing them from disturbing the other NFC antenna A1, A2.

Each NFC antenna, the first NFC antenna A1 and the second NFC antenna A2, is linked to a dedicated NFC reader, respectively to a first NFC reader 21 and to a second NFC reader 22, both connected to a microcontroller 20.

This bidirectional detection device D from the prior art has the drawbacks of being expensive (two ferrites F1, F2, two NFC readers 21, 22 and a copper layer C) and, due to the proximity between the first NFC antenna and the second NFC antenna A1, A2, of substantially impairing their performance, in spite of the presence of the two ferrites F1, F2 and of the additional copper layer C.

SUMMARY OF THE INVENTION

An aspect of the invention proposes a bidirectional detection device that mitigates these drawbacks.

An aspect of the invention proposes a device for the bidirectional detection of the approach of a portable apparatus for near-field hands-free access to a vehicle, said device comprising a communication antenna having a near-field communication frequency and a predetermined quality factor and maximum bandwidth so as to communicate with said portable apparatus, a reader, linked to a microcontroller, and the portable apparatus being equipped with wireless near-field communication means, said device being noteworthy in that it furthermore comprises:

A first passive inductive sensor directed toward the outside of the vehicle, having a first resonant frequency situated within a window with a value around the communication frequency and different from said communication frequency, and having a first quality factor greater than the quality factor of the communication antenna, a second passive inductive sensor directed toward the inside of the vehicle, having a second resonant frequency situated within a window with a value around the communication frequency and different from the communication frequency and different from the first resonant frequency, and having a second quality factor greater than the quality factor of the communication antenna, the first passive inductive sensor and the second passive inductive sensor being situated opposite one another, separated by a ferrite, and receiving the electromagnetic field emitted by the communication antenna, means for measuring a first voltage across the terminals of the first passive inductive sensor and means for measuring a second voltage across the terminals of the second passive inductive sensor, means for comparing between the first voltage and the second voltage so as to detect the approach of the portable apparatus coming from outside or coming from inside the vehicle.

The device of an aspect of the invention therefore cleverly makes it possible to detect the approach of the portable apparatus coming from outside or inside the vehicle, so as to communicate with the latter and to trigger the actions desired by the user.

Preferably, the absolute value of a first difference between the first resonant frequency and the communication frequency and the absolute value of a second difference between the second resonant frequency and the communication frequency is greater than the maximum bandwidth of the communication antenna.

Advantageously, the first passive inductive sensor and the second passive inductive sensor respectively comprise a first coil linked to a first capacitor, and a second coil linked to a second capacitor, the first and the second coils having identical dimensions and the first quality factor being equal to the second quality factor.

In one preferred embodiment, the communication antenna, the first coil, the second coil and the ferrite are concentric and are arranged in parallel planes.

Plus, the first and the second coils each have dimensions that are smaller than the dimensions of the communication antenna.

Expediently, the ferrite has dimensions that are substantially equal to either one of the first or second coil.

An aspect of the invention also relates to a bidirectional approach detection method using the detection device according to one of the features listed above, said detection method being noteworthy in that it comprises the following steps:

Measuring a first voltage across the terminals of the first passive inductive sensor, and measuring a second voltage across the terminals of the second passive inductive sensor, and comparing the first voltage with the second voltage so as to distinguish the approach of the portable apparatus coming from outside the vehicle from the approach of the portable apparatus coming from inside the vehicle, if the first voltage is lower than the second voltage, then the portable apparatus is situated outside the vehicle, otherwise the portable apparatus is situated inside the vehicle.

Lastly, an aspect of the invention applies to any motor vehicle comprising a bidirectional approach detection device according to any one of the features listed above.

BRIEF DESCRIPTION OF THE DRAWINGS

Other features and advantages of the present invention will become more apparent from reading the following description, provided by way of non-limiting example and with reference to the appended drawings, in which.

DETAILED DESCRIPTION OF THE PREFERRED EMBODIMENTS

Figure 1:
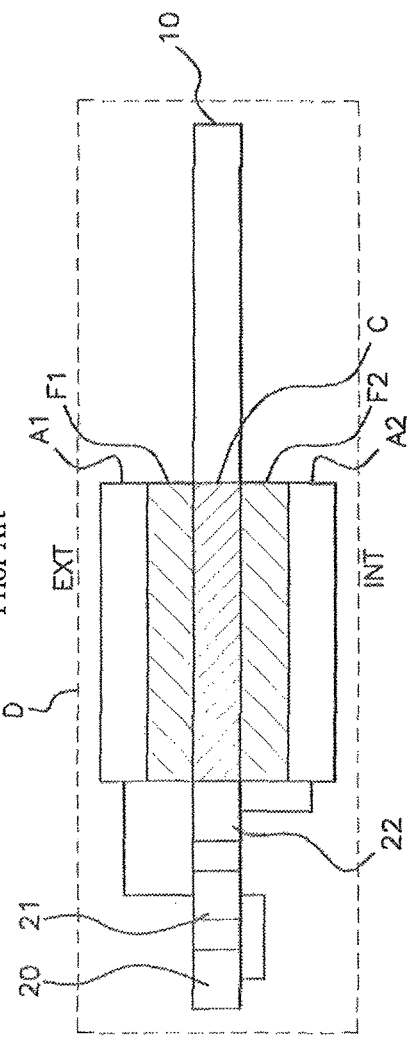
FIG. 1 (explained above) schematically illustrates a sectional view of the bidirectional detection device D from the prior art, FIG. 2 schematically illustrates a sectional view of the bidirectional detection device D' according to an aspect of the invention, FIG. 3 schematically shows a plan view of the bidirectional detection device D' of an aspect of the invention, FIG. 4 schematically shows the quality factors $Q_{S1}$, $Q_{S2}$ of the inductive sensors, in relation to the quality factor $Q_A$ of the communication antenna, FIG. 5 schematically shows the approach of a portable apparatus P of a user, situated outside the vehicle, toward the bidirectional detection device D' of an aspect of the invention, FIG. 6 schematically illustrates the voltages across the terminals of the inductive sensors, in the position of the portable apparatus P as shown in FIG. 5.
Figure 2:
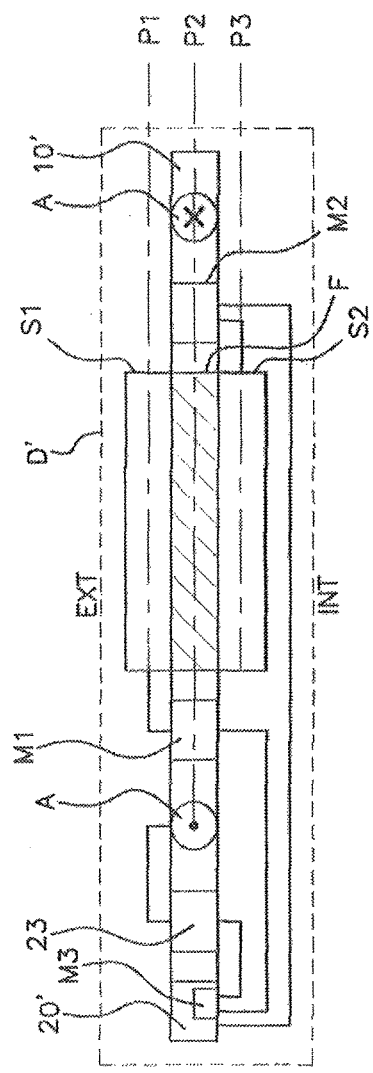

The device D' for bidirectional detection of the approach of a portable apparatus P for hands-free access to a vehicle according to an aspect of the invention is illustrated in FIG. 2.

The detection device D' comprises a near-field communication, termed NFC, antenna A in order to communicate with the portable apparatus P (not shown in FIG. 2), as well as an NFC reader 23, linked to said antenna A, which NFC reader is itself connected electrically to a microcontroller 20'.

The communication antenna A is characterized by a communication frequency Fc, of the order of 13.56 MHz, a bandwidth Bd, with a value situated between 108 Kbits/s and 868 Kbits/s, and a quality factor $Q_A$, all of these being predetermined. The communication antenna A periodically emits, upon request from the microcontroller 20', an electromagnetic field in order to communicate with a portable apparatus P located within the range of said communication antenna A.

The portable apparatus P is equipped with wireless near-field communication means in order to be able to communicate with the detection device D', in this instance in order to be able to exchange an identifier with the latter and to enable the vehicle to be unlocked or started.

An aspect of the invention relates to a bidirectional detection device D' for detecting the approach of a compatible portable apparatus P, that is to say one that is equipped with NFC communication means, toward said communication antenna A, whether the portable apparatus P be situated inside INT or outside EXT the vehicle.

The detection device D' according to an aspect of the invention makes it possible to distinguish the approach of the portable apparatus P located inside INT the vehicle, thereby meaning that the user is then requesting starting of the vehicle, from the approach of the portable apparatus located outside EXT the vehicle, thereby meaning that the user is then requesting unlocking of his vehicle.

Of course, once the detection has been performed, the action of unlocking or of starting the vehicle will be authorized only after an identifier has been exchanged between the communication antenna A and the portable apparatus P and it has been confirmed that the portable apparatus P has been paired correctly with the vehicle.

According to an aspect of the invention, the bidirectional detection device D' furthermore comprises:

A first passive inductive sensor S1 directed toward the outside EXT of the vehicle, a second passive inductive sensor S2 directed toward the inside INT of the vehicle, the first passive inductive sensor and the second passive inductive sensor S1, S2 are situated opposite one another, separated by a ferrite F, and are arranged in such a way that they receive the electromagnetic field coming from the communication antenna A; said two inductive sensors S1, S2 therefore each have, at their terminal, a voltage, a first voltage V1 and a second voltage V2, means M1 for measuring a first voltage V1 across the terminals of the first sensor S1 and means M2 for measuring a second voltage V2 across the terminals of the second passive inductive sensor S2, means M3 for comparing between the first voltage V1 and the second voltage V2.

The first passive inductive sensor S1 and the second passive inductive sensor S2 each have a resonant frequency, respectively a first resonant frequency $F_{R1}$ and a second resonant frequency $F_{R2}$, contained within a window of values around the communication frequency Fc but different from the communication frequency Fc of the communication antenna A.

In one preferred embodiment, the absolute value of the difference between the first resonant frequency $F_{R1}$ and the communication frequency Fc and the absolute value of the difference between the second resonant frequency $F_{R2}$ and the communication frequency Fc is greater than the predetermined maximum bandwidth of the communication antenna A, in other words:

$$|F_{R1}-Fc|>Bd\max$$

And $$|F_{R2}-Fc|>Bd\max$$

Where:

$F_{R1}$: Resonant frequency of the first passive inductive sensor S1, $F_{R2}$: Resonant frequency of the second passive inductive sensor S2, Fc: Communication frequency of the communication antenna A, Bdmax: maximum bandwidth of the communication antenna A.

In other words, the first resonant frequency $F_{R1}$ and the second resonant frequency $F_{R2}$ are located outside of the bandwidth Bd of the communication antenna A. The two inductive sensors S1, S2 thus do not disturb the data sent and received by the communication antenna A.

For example:
Fc=13.56 MHz,
And $F_{R1}$=12.56 MHz,
$F_{R2}$=14.56 MHz,
Where Bdmax=868 Kbits/s.

The first passive inductive sensor S1 and the second passive inductive sensor S2 each have a quality factor, respectively a first quality factor $Q_{S1}$ and a second quality factor $Q_{S2}$, greater than the quality factor $Q_A$ of the communication antenna A, and are therefore sensitive to the approach of any portable apparatus P having a near-field communication (NFC) frequency.

For example:
$Q_A$<35,
And $Q_{S1}$>80,
$Q_{S2}$>80.

Preferably, the first passive inductive sensor S1 and the second passive inductive sensor S2 respectively take the form of a first copper coil B1, not supplied with a voltage, linked to a first capacitor C1, and the form of a second copper coil B2, not supplied with a voltage, linked to a second capacitor C2 (cf. FIG. 3), and the two coils B1, B2 have identical dimensions.

The first capacitor C1 and the second capacitor C2 are matching capacitors that make it possible to adjust the first resonant frequency $F_{R1}$ and the second resonant frequency $F_{R2}$ to the desired values, in our example to values that are close to the communication frequency Fc but that are not contained within the bandwidth Bd of the communication antenna A.

Preferably, the communication antenna A, the first coil B1, the second coil B2 and the ferrite F are concentric (cf. center O in FIG. 3) and are positioned in parallel planes P1, P2, P3 (cf. FIG. 2).

Figure 3:
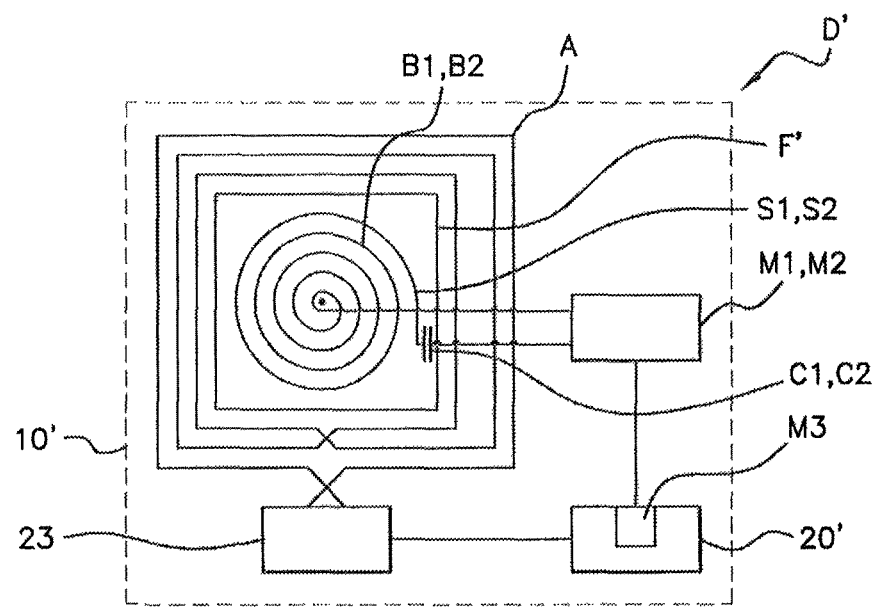
Figure 4:
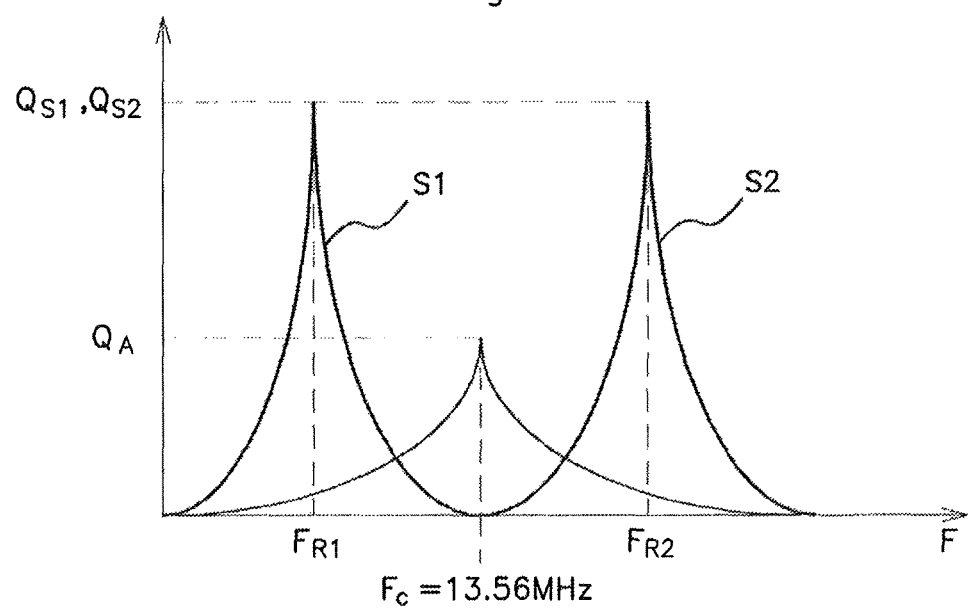

Plus, the first coil B1 and the second coil B2 have dimensions that are smaller than the dimensions of the communication antenna A (cf. FIG. 3).

The ferrite F has dimensions that are substantially equal to the dimensions of the coils B1, B2 (cf. FIG. 2).

The operation of the bidirectional detection device D' according to an aspect of the invention will now be described below.

The communication antenna A, upon a command from the microcontroller 20', emits a near-field electromagnetic field around itself in a cyclic manner. Said communication antenna A is positioned in the vehicle in such a way that one part of the electromagnetic field is directed toward the inside INT of the vehicle and another part is directed toward the outside EXT of the vehicle. The communication antenna A is for example integrated into the window of a vehicle door or into the metal frame of this window.

Figure 5:
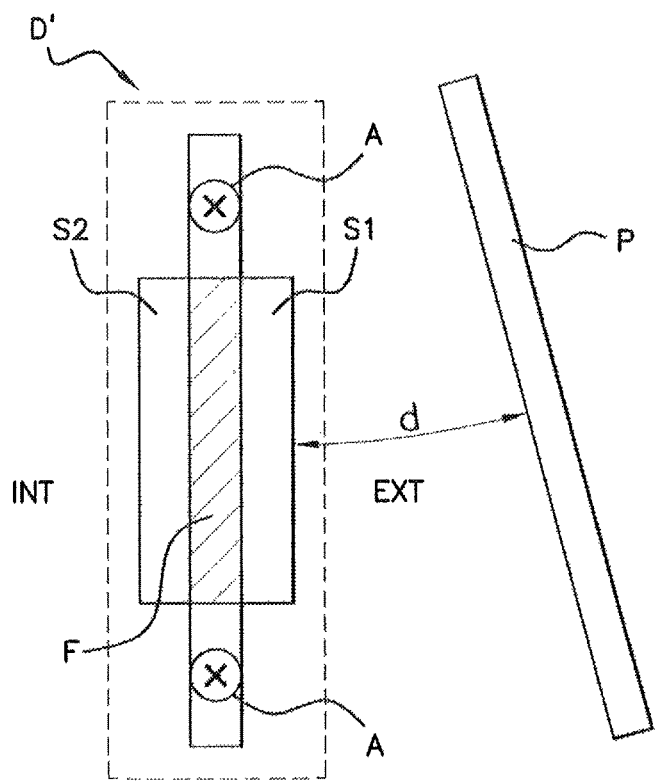
Figure 6:
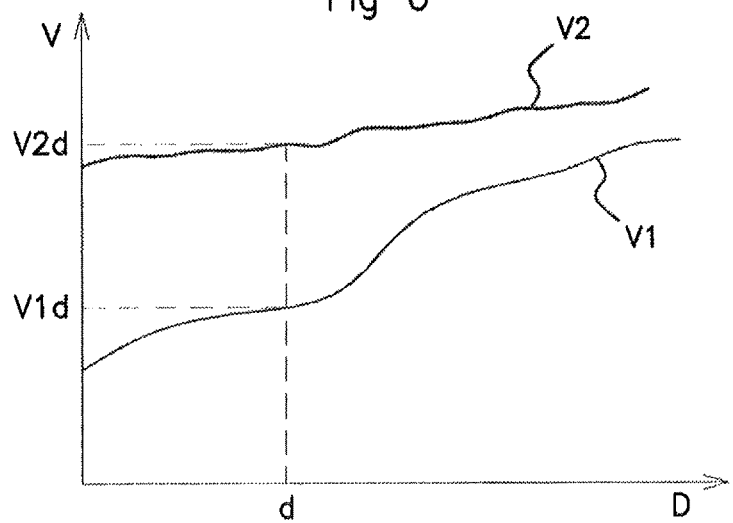

Any portable apparatus P equipped with NFC communication means and located for example outside EXT the vehicle, and approaching the first passive inductive sensor S1 (cf. FIG. 5), modifies the electromagnetic field emitted by the communication antenna A and creates a mismatch with the first resonant frequency $F_{R1}$ of the first coil B1, bringing about a reduction in the first voltage V1 across the terminals of said first coil B1 (cf. FIG. 6).

The second coil B2, for its part, being located in a manner separated and electromagnetically isolated from the first coil B1 by the ferrite F, and directed toward the inside of the vehicle V, is not subject to electromagnetic disturbance caused by the presence of the portable apparatus P. The second voltage V2 across the terminals of the second coil B2 remains substantially at a constant value, in spite of the approach of the portable apparatus P (cf. FIG. 6).

The reduction in the first voltage V1 is proportional to the distance d separating the portable apparatus P from the first passive inductive sensor S1.

When the portable apparatus P is located outside EXT the vehicle at a distance d from the detection device D', as illustrated in FIG. 6, the value of the first voltage V1d of the first passive inductive sensor S1 is lower than the value of the second voltage V2d of the second passive inductive sensor S2.

Conversely, when the portable apparatus P is located inside INT the vehicle, and approaches the second passive inductive sensor S2 (case not illustrated in FIG. 5), it modifies the electromagnetic field emitted by the communication antenna A and creates a mismatch with the second resonant frequency $F_{R2}$ of the second coil B2, bringing about a reduction in the second voltage V2 across the terminals of said second coil B2 (case not illustrated in FIG. 6).

The first coil B1, for its part, for similar reasons cited above (presence of the ferrite F), is not subject to electromagnetic disturbance caused by the presence of the portable apparatus P. Plus, when the portable apparatus P is located inside INT the vehicle at a distance d' from the detection device D', the value of the second voltage V2$d'$ is lower than the value of the first voltage V1$d'$.

By measuring and then by comparing the first voltage V1 with the second voltage V2, the detection method of an aspect of the invention therefore makes it possible to distinguish the approach of the portable apparatus P toward the detection device D' when said portable apparatus is located outside EXT the vehicle from the approach of the portable apparatus P toward the detection device D' when said portable apparatus is located inside INT the vehicle.

The detection method of an aspect of the invention therefore comprises the following steps:
Measuring a first voltage V1 across the terminals of the first passive inductive sensor S1, and
measuring a second voltage V2 across the terminals of the second passive inductive sensor S2, and
comparing the first voltage V1 with the second voltage V2 so as to distinguish the approach of the portable apparatus P coming from outside EXT the vehicle from the approach of the portable apparatus P coming from inside INT the vehicle,
if the first voltage V1 is lower than the second voltage V2, then the portable apparatus is situated outside EXT the vehicle, otherwise it is situated inside INT the vehicle.

Once the detection has been performed using the detection method of an aspect of the invention, an identifier is then exchanged between the communication antenna A and the portable apparatus P, and if the identifier is confirmed, the corresponding actions may then be implemented, that is to say either unlocking of those components of the vehicle that open or starting of the engine of the vehicle.

An aspect of the invention therefore makes it possible, in an inexpensive manner (two coils and two capacitors), to distinguish the approach of a portable apparatus from outside the vehicle toward the NFC communication antenna, representative of the desire of the user to unlock his vehicle, from the approach of the portable apparatus from inside the vehicle toward the NFC communication antenna, representative of the desire of the user to start his vehicle.

The detection device D' of an aspect of the invention is particularly advantageous in comparison with the detection device D from the prior art, as it comprises fewer components (just one ferrite, no copper layer, and just one NFC reader, instead of two ferrites, a copper layer and two NFC readers); in particular, the absence of a second NFC antenna eliminates the problem of potential interference between the two NFC antennae of the detection device D from the prior art.

The invention claimed is:

1. A device for the bidirectional detection of the approach of a portable apparatus for near-field hands-free access to a vehicle, said device comprising:
a communication antenna having a near-field communication frequency and a predetermined quality factor and maximum bandwidth so as to communicate with said portable apparatus,
a reader, linked to a microcontroller, and the portable apparatus being equipped with wireless near-field communication means,
a first passive inductive sensor, directed toward an outside of the vehicle, having a first resonant frequency situated within a window with a value around the communication frequency and different from said communication frequency, and having a first quality factor greater than the quality factor of the communication antenna,
a second passive inductive sensor, directed toward an inside of the vehicle, having a second resonant frequency situated within a window with a value around the communication frequency and different from the communication frequency and different from the first resonant frequency, and having a second quality factor greater than the quality factor of the communication antenna,
the first passive inductive sensor and the second passive inductive sensor being situated opposite one another, separated by a ferrite, and receiving an electromagnetic field emitted by the communication antenna,
means for measuring a first voltage across terminals of the first passive inductive sensor and means for measuring a second voltage across the terminals of the second passive inductive sensor, and
means for comparing between the first voltage and the second voltage so as to detect the approach of the portable apparatus coming from outside or coming from inside the vehicle.

2. The bidirectional approach detection device as claimed in claim 1, wherein an absolute value of a first difference between the first resonant frequency and the communication frequency and an absolute value of a second difference between the second resonant frequency and the communication frequency is greater than the maximum bandwidth of the communication antenna.

3. The bidirectional approach detection device as claimed in claim 1, wherein the first passive inductive sensor and the second passive inductive sensor respectively comprise a first coil linked to a first capacitor, and a second coil linked to a second capacitor, the first and the second coils having identical dimensions and the first quality factor being equal to the second quality factor.

4. The bidirectional approach detection device as claimed in claim 3, wherein the communication antenna, the first coil, the second coil and the ferrite are concentric and are arranged in parallel planes.

5. The bidirectional approach detection device as claimed in claim 3, wherein the first and the second coils each have dimensions that are smaller than the dimensions of the communication antenna.

6. The bidirectional approach detection device as claimed in claim 3, wherein the ferrite has dimensions that are substantially equal to either one of the first or second coil.

7. A bidirectional approach detection method using the detection device as claimed in claim 1, said detection method comprising:
measuring a first voltage across the terminals of the first passive inductive sensor, and
measuring a second voltage across the terminals of the second passive inductive sensor, and
comparing the first voltage with the second voltage so as to distinguish the approach of the portable apparatus coming from outside the vehicle from the approach of the portable apparatus coming from inside the vehicle,
if the first voltage is lower than the second voltage, then the portable apparatus is situated outside the vehicle, otherwise the portable apparatus is situated inside the vehicle.

8. A motor vehicle, comprising a bidirectional approach detection device as claimed in claim 1.

9. The bidirectional approach detection device as claimed in claim 2, wherein the first passive inductive sensor and the second passive inductive sensor respectively comprise a first coil linked to a first capacitor, and a second coil linked to a second capacitor, the first and the second coils having identical dimensions and the first quality factor being equal to the second quality factor.

10. The bidirectional approach detection device as claimed in claim 4, wherein the first and the second coils each have dimensions that are smaller than the dimensions of the communication antenna.

11. The bidirectional approach detection device as claimed in claim 4, wherein the ferrite has dimensions that are substantially equal to either one of the first or second coil.

12. The bidirectional approach detection device as claimed in claim 5, wherein the ferrite has dimensions that are substantially equal to either one of the first or second coil.

* * * * *